United States Patent [19]

Jadwin et al.

[11] Patent Number: 4,653,318

[45] Date of Patent: Mar. 31, 1987

[54] ELECTRONIC STATOR MEASUREMENT DEVICE

[75] Inventors: Reese Jadwin, Westminster, Calif.; Roger P. Herbert, Spring, Tex.; Franklin L. Schulte, Rancho Santa Fe; Sheldon Rubin, San Diego, both of Calif.

[73] Assignee: Smith International, Inc., Newport Beach, Calif.

[21] Appl. No.: 774,306

[22] Filed: Sep. 10, 1985

[51] Int. Cl.⁴ .......................... G01B 7/12; G01B 7/28; G01B 5/12

[52] U.S. Cl. ..................................... 73/151; 33/178 F

[58] Field of Search ................ 73/151, 1 J; 33/178 E, 33/178 F, 178 R, 302, 544; 418/48

[56] References Cited

U.S. PATENT DOCUMENTS

| | | | |
|---|---|---|---|
| 2,514,355 | 7/1950 | Barnes | 33/178 F |
| 2,607,128 | 8/1952 | Newhall | 33/178 E |
| 2,699,001 | 1/1955 | McMahan | 33/178 F |
| 2,708,316 | 5/1955 | Fredd | 33/178 F |
| 4,021,925 | 5/1977 | Loftus | 33/178 F |
| 4,247,985 | 2/1981 | Boyle | 33/178 F |
| 4,302,881 | 12/1981 | Schwind et al. | 33/178 F |

FOREIGN PATENT DOCUMENTS

| | | | |
|---|---|---|---|
| 0747295 | 4/1956 | United Kingdom | 33/178 F |
| 1603673 | 11/1981 | United Kingdom | 73/1 J |

*Primary Examiner*—Stephen A. Kreitman
*Assistant Examiner*—Scott M. Oldham
*Attorney, Agent, or Firm*—Price, Gess & Ubell

[57] ABSTRACT

A device for measuring the cross section of the stator of a downhole motor having a carrier shaped to travel through the helicoidal interior of the stator and a sensor including first and second bending beam-strain gage structures for generating electrical signals indicative of the cross section of the stator.

13 Claims, 11 Drawing Figures

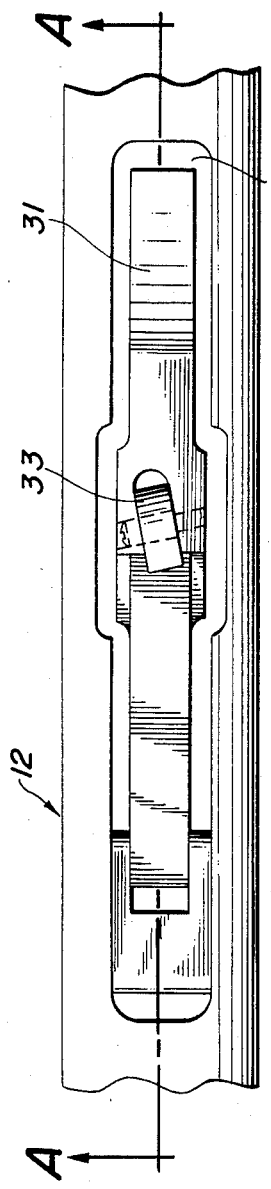
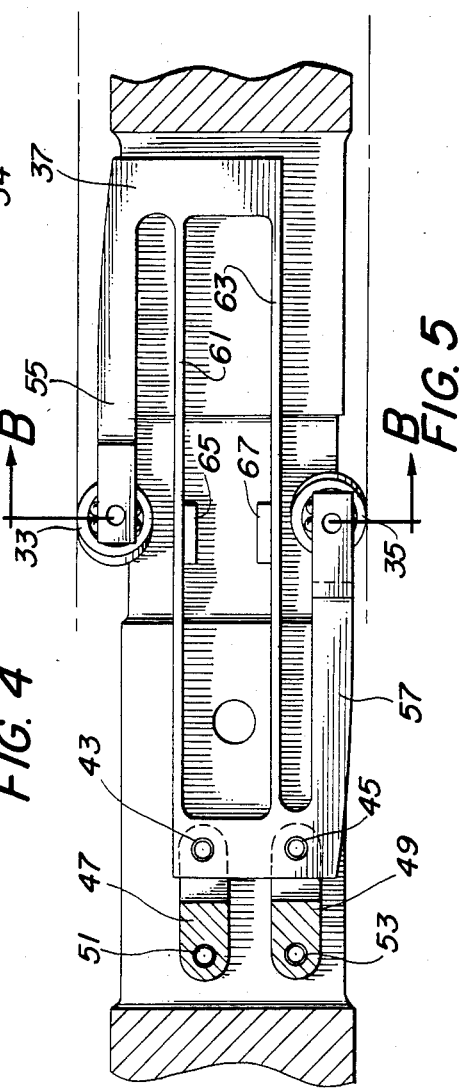
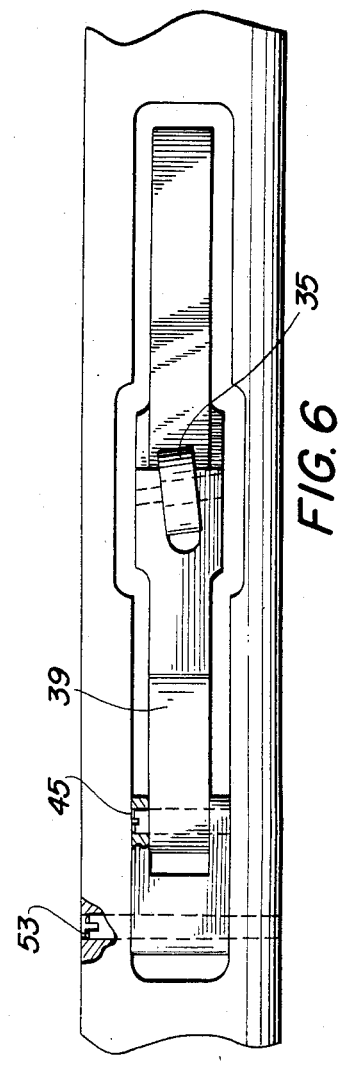
FIG. 4  FIG. 5  FIG. 6
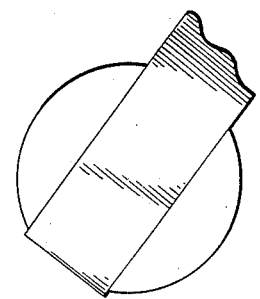
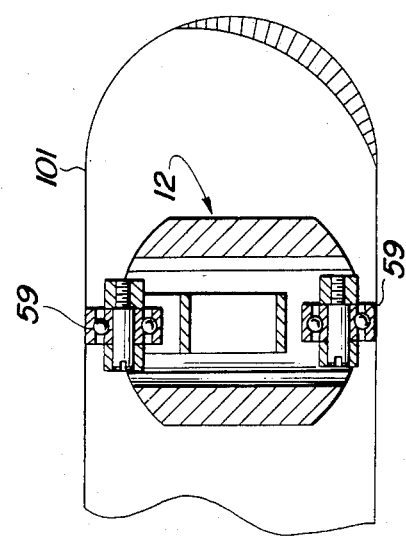
FIG. 8  FIG. 7

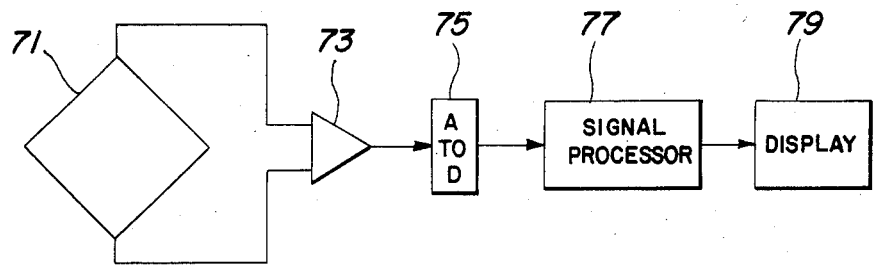
FIG. 9
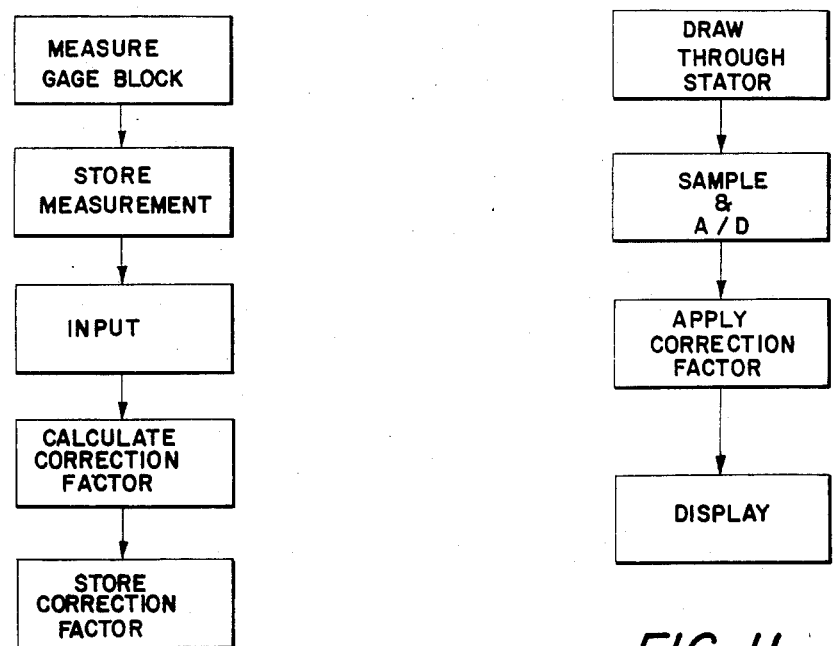
FIG. 10
FIG. 11

ELECTRONIC STATOR MEASUREMENT DEVICE

BACKGROUND OF THE INVENTION

The subject invention relates to measuring devices and in particular to a device for electronic measurement of the stator diameter of a downhole mud motor.

Such a motor has two basic parts, a rotor and a stator. The rotor shape is a helix or spiral and is round in cross section. This part is typically machined from a solid, alloy-steel bar and is electronically plated with a special hard chrome to reduce friction and abrasive wear to the motor components.

The stator outer body is a typical length of tubular steel and is lined with a special rubber-like compound throughout the tube length. This lining is Buna-N, a nitrile elastomer specially formulated for resistance to abrasion and hydrocarbon deterioration. In the stator manufacturing process, a special helix-like core is first centered in the tube. Then the elastomer is injected into the tube and allowed to cure partially. When this core is finally removed, a cavity is formed, also having the shape of a helix or spiral.

Such a mud motor derives its power from the seal created between the hard-chromed rotor, and the Buna "N" rubber of the stator. The rotor's outside diameter is larger than the stator rubber's inside diameter. Hence, the larger diameter rotor pushes aside the smaller diameter stator rubber, compressing it to create an effective seal and, in turn, power.

"Motor sizing" is the act of adjusting the amount by which the rotor is larger than the stator. For each motor type, there is a recommended motor size range, called motor compression. Correct compression leads to optimum performance. Incorrect compression causes premature wear or poor performance.

It is very important to measure the "motor compression" during tool repair to determine the amount of wear and adjustment necessary. This requires that the outside diameter of the rotor and the inside diameter of the stator be accurately measured. The rotor can be easily measured with a caliper or micrometer. However, the stator's helicoidal interior presents a difficult measurement problem. In the prior art, a set of "wafer gauges" has been used to measure the stator's inside diameter. Different gauges from the set are passed through the stator, for example, at the end of a rod, until the gauge size which passes through with uniform slight resistance is determined. Needless to say, this is a relatively tedious and inexact process.

SUMMARY OF THE INVENTION

It is therefore an object of the invention to provide improved measuring apparatus.

It is another object of the invention to provide an improved device for measuring structures having a helicoidal interior.

It is yet another object of the invention to provide a quicker and more accurate measurement apparatus for measuring the inner diameter of the stator of a downhole mud motor.

It is still another object of the invention to provide such an apparatus which accommodates electronic readout.

These and other objects of the invention are met by a measuring device bearing telescopic feelers and capable of being pulled through the helicoidal interior of the stator of a downhole motor. The telescopic feelers interact with transducers to transmit the inner diameter of the stator as an electrical signal via a trailing cable. An electric circuit may then calculate and display an average inner diameter and other data.

BRIEF DESCRIPTION OF THE DRAWINGS

The just summarized invention will now be described in detail in conjunction with the drawings of which:

FIGS. 4 and 6 are plan views of the measurement member of the preferred embodiment.

FIG. 5 is a section taken at AA of FIG. 4.

FIG. 7 is a section view taken at B—B of FIGS. 4–6.

FIG. 8 illustrates an alternative embodiment.

FIG. 9 is a schematic diagram of electrical circuitry for generating a display indication in conjunction with the preferred embodiment.

FIG. 10 is a flow diagram illustrating a method of calibration employable with the preferred embodiment.

FIG. 11 is a flow diagram illustrating operation of the preferred embodiment.

DETAILED DESCRIPTION OF THE PREFERRED EMBODIMENT

Figure 1:
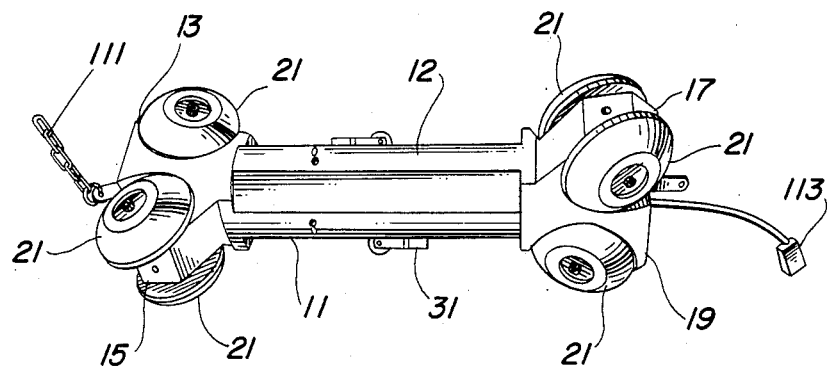
FIG. 1 is a perspective view of the preferred embodiment.

The measuring device of the preferred embodiment is illustrated in FIG. 1. As shown, the device generally includes a "dog bone" carrier member 11 having a number of "ears" 13, 15, 17, 19, two at each end, mounted to a central member 12 of tubular obround cross section. This carrier member 11 is illustrated more particularly in FIGS. 2–6. Each ear 13, 15, 17, 19 is fitted with a pair of rollers 21. The rollers 21 are angled by the ears 13, 15, 17, 19 such that the carrier member 11 will spiral down the internal helicoidal structure of the stator 101. A chain 111 for pulling the carrier member 11 through the stator 101 and an electrical connection 113 are also shown in FIG. 1.

Figure 2:
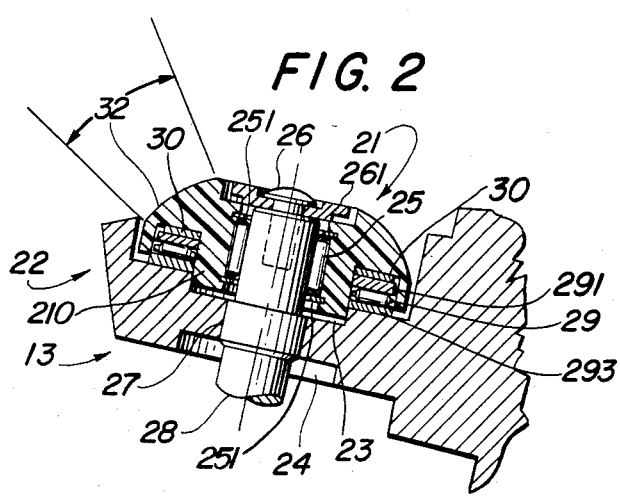
FIG. 2 is a section of one portion of the carrier member of the preferred embodiment.
Figure 3:
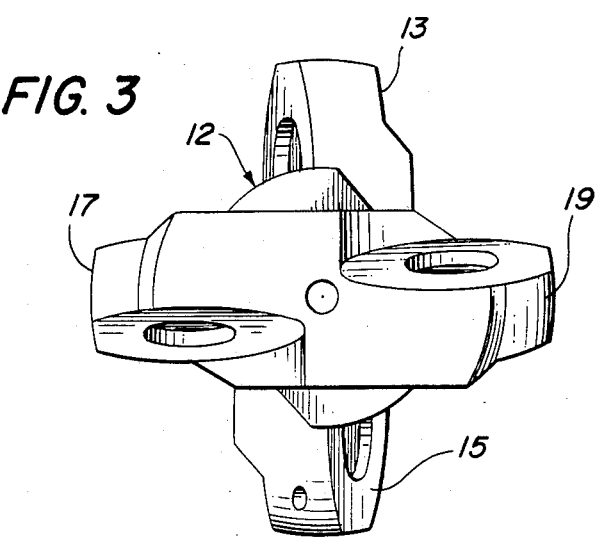
FIG. 3 is an end view of the carrier member.

FIG. 2 illustrates a cross section of an ear 13 including a roller 21 mounted on a projecting arm 22. Each roller 21 of FIG. 1 is preferably fabricated identically to that shown in FIG. 2.

The projecting arm 22 includes recessed surface areas 23, 24 for receiving the central hub 210 of the roller 21 and an opening 27 for receiving a shaft 28 upon which the roller 21 is arranged to rotate. A second roller 21 (not shown) is mounted on the shaft 28, its hub 210 being received by the recess 24. Each roller 21 is held in place on the shaft 28 by a threaded bolt 26 and washer insert 261. Rotation is facilitated by needle bearings 25 situated between respective retainer rings 251.

The roller 21 is springloaded by Belleville springs 30 such that it may move a slight amount parallel to the shaft 28. The springs 30 act upon respective upper thrust races 291. Lower thrust races 293 are mounted in recesses in the arm 22. Between the upper and lower thrust races 291, 293 are mounted needle thrust bearings 29. The optimum tension and travel of the springs 30 will vary with the application but are selected to achieve most efficient passage of the carrier member 11. Depending upon the required load and space available, helical springs may be used in place of Belleville springs 30.

The roller 21 further has a radial crown 32 which facilitates passage of the carrier 11 through the stator. Without such a radial crown, passage through the stator 101 is difficult. In an alternative embodiment, spherical balls (FIG. 8) could be used instead of rollers to facilitate passage through the stator.

FIG. 1 also shows the sensor assembly 31 carried by the carrier member 11. The sensor assembly 31 is shown in detail in FIGS. 4-7. The sensor assembly 31 is mounted in a cavity 34 in the central member 12 and includes first and second wheels, 33, 35 mounted on a bending beam structure 37.

The bending beam structure 37 is pivotably attached by first and second roll pins 43, 45 to first and second links 47, 49. The first and second links 47, 49 are, in turn, fastened by roll pins 51, 53 within the interior of the cavity 34 in the central member 12. The bending beam structure further includes first and second arms 55, 57 on which the wheels 33, 35 are rotatably mounted, preferably by bearings 59 as shown in FIG. 7. The first arm 55 attaches at the end of the structure 37 most distant from the links 47, 49, while the second arm 57 attaches at the end nearest the links 47, 49. The first arm 55 is maintained at its extended position by first and second rails 61, 63. The rails 61, 63 are fabricated of a flexible metal, permitting the arms 55, 57 to flex when they are inwardly compressed.

Strain gages 65, 67 are attached to the rails 61, 63 and have electrical leads extending therefrom and through the carrier member 12. Since the inner diameter of the stator 101 is being measured, the wheels 33, 35 are oriented to conform to that surface. The arms 55, 57 extend the wheels such that the distance between them exceeds the inside diameter of the stator 101. The beams are thus compressed towards each other as the carrier member 12 proceeds through the stator. The strain gauges 65, 67 measure the bending forces in the beams 55, 57. These bending forces are directly proportional to the deflection of the wheels 33, 35.

Each strain gauge 65, 67 is a resistive element and is wired into a respective arm of a Wheatstone bridge circuit 71 (FIG. 11). The output of the bridge circuit 71 is amplified by an amplifier 73 and A-D converted by an A-D converter 75 to give a digital measurement signal. This signal is then processed by a digital signal processor 77 to generate and display the desired cross section measurement. The digital processor is designed to perform an averaging function and is connected to a well-known display circuitry 79 to display either individual measurements or average measurement values. The digital processor 77 may comprise discrete logic or a commercially available microprocessor programmed to perform averaging and other desired functions and to control a display 79, as well-known in the art.

The subject invention provides the additional advantage of automatic digital calibration. According to the method of the invention illustrated in FIGS. 12-13, a gauge block is constructed having two precision-machined openings, one a larger diameter and one a smaller diameter. A measurement is made of both diameters using the measuring device of the invention and the measured quantities are stored, for example, in a digital memory device. The actual diameters of the measured openings are then input to a digital calculator which calculates a correction factor to account for offset and gain errors. This correction factor is stored in the digital memory and applied to subsequent measurements to automatically correct them.

As will be apparent to those skilled in the art, the just described preferred embodiment is subject to numerous modifications and adaptations without departing from the scope and spirit of the invention. Therefore, it is to understood that, within the scope of the appended claims, the invention may be practiced other than as specifically described herein.

What is claimed is:

1. Measurement apparatus for the stator of a downhole motor having a substantially helicoidal interior comprising:
   an elongated central carrier member having a cavity therein;
   first and second surface tracking means mounted at each respective end of said central carrier member for slidably engaging and tracking the helicoidal interior surface of said stator so as to guide said central carrier member through said interior; and
   sensor means carried by said central carrier member in said cavity for generating an electrical signal indicative of the crossectional size of said stator.

2. The apparatus of claim 1 wherein said sensor means includes:
   means including first and second bending beams mounted in said cavity for contacting said helicoidal interior surface.

3. The apparatus of claim 2 wherein said sensor means further includes means for generating electrical signals proportional to the forces impacting said first and second bending beams.

4. The apparatus of claim 1 wherein each said surface tracking means comprises:
   first means for riding in said helicoidal interior surface; and
   second means for riding in said helicoidal interior surface.

5. The apparatus of claim 4 wherein said first means includes:
   a pair of rollers mounted on a first axis, each said roller having a radial crown.

6. The apparatus of claim 4 where said second means includes:
   a second pair of rollers mounted on a second axis, each said roller having a radial crown.

7. The apparatus of claim 6 wherein the rollers of said first pair are mounted at the opposite ends of a shaft means disposed on said first axis and the rollers of said second pair are mounted at opposite ends of a shaft means disposed on said second axis.

8. The apparatus of claim 7 wherein said shaft means are retained by a unitary member attached to said carrier member.

9. The apparatus of claim 4 wherein said first and second means each provide a surface at least partially curved to a selected radius for contacting said helicoidal interior surface.

10. The apparatus of claim 4 wherein each said first and second means comprise a spherical ball for tracking the helicoidal interior surface of said stator.

11. The apparatus of claim 3 further including means for electrically generating and displaying an indication of said cross-sectional size.

12. The apparatus of claim 11 further including means for calibrating said indication generating means.

13. Measurement apparatus for a stator having a helicoidal interior cavity comprising:
   an elongated carrier body having first and second ends and a central axis;

a first arm projecting from said carrier body at said first end and having a first pair of mounting surface areas, the respective mounting surface areas of said first pair being disposed in parallel planes on opposite sides of said first arm;

a second arm projecting from said carrier body at said first end and having a second pair of mounting surface areas, the respective mounting surface areas of said second pair being disposed in parallel planes on opposite sides of said second arm;

a third arm projecting from said carrier body at said second end and having a third pair of mounting surface areas, the respective mounting surface areas of said third pair being disposed in parallel planes on opposite sides of said third arm;

a fourth arm projecting from said carrier body at said opposite end and having a fourth pair of mounting surface areas, the respective surface areas of said fourth pair being disposed in parallel planes on opposite sides of said fourth arm;

a roller means mounted on each of said mounting surface areas, each of said roller means having a radial surface thereon:

the respective planes of said first, second, third, and fourth pair of mounting surface areas being angled with respect to said axis of said carrier body such that the radial surface of each said roller means slidably engages said helicoidal interior cavity; and sensor means on said carrier body for generating an electrical signal indicative of the crossectional size of said stator.

* * * * *